United States Patent [19]

Hinn

[11] Patent Number: 4,641,194
[45] Date of Patent: Feb. 3, 1987

[54] KINESCOPE DRIVER IN A DIGITAL VIDEO SIGNAL PROCESSING SYSTEM

[75] Inventor: Werner Hinn, Zollikerberg, Switzerland

[73] Assignee: RCA Corporation, Princeton, N.J.

[21] Appl. No.: 644,398

[22] Filed: Aug. 27, 1984

[51] Int. Cl.⁴ .......................... H04N 5/68; H04N 9/16
[52] U.S. Cl. ...................................... 358/242; 358/74; 358/184
[58] Field of Search ............... 358/242, 74, 243, 64, 358/184, 166, 160, 22; 330/277

[56] References Cited

U.S. PATENT DOCUMENTS

| 4,240,039 | 12/1980 | Mihalich | 330/277 X |
| 4,257,068 | 3/1981 | Johnston | 358/242 |
| 4,387,405 | 6/1983 | Hinn | 358/243 |
| 4,528,585 | 7/1985 | Bolger | 358/160 X |
| 4,539,593 | 9/1985 | Jutier et al. | 358/160 |
| 4,563,654 | 1/1986 | Arai et al. | 330/277 |

FOREIGN PATENT DOCUMENTS

| 2102644 | 2/1983 | United Kingdom . |
| 2121658 | 12/1983 | United Kingdom . |
| 2127252 | 4/1984 | United Kingdom . |
| 2141307 | 12/1984 | United Kingdom . |
| 2145903 | 4/1985 | United Kingdom . |

OTHER PUBLICATIONS

"Digital VLSI Breeds Next-Generation TV Receivers", *Electronics*, Aug. 11, 1981, pp. 97-103.
Selected pages from a technical bulletin of the Semiconductor Division of ITT Corporation, titled "Digit 2000 VLSI Digital TV System".

*Primary Examiner*—James J. Groody
*Assistant Examiner*—E. Anne Toth
*Attorney, Agent, or Firm*—P. J. Rasmussen; P. M. Emanuel; R. H. Kurdyla

[57] ABSTRACT

In a digital video signal processing system including a kinescope for displaying a video image, a video signal digital-to-analog converter receives input digital video signals and provides high level output analog video signals with a magnitude suitable for directly driving an intensity control electrode (e.g., cathode) of the kinescope.

11 Claims, 8 Drawing Figures

KINESCOPE DRIVER IN A DIGITAL VIDEO SIGNAL PROCESSING SYSTEM

This invention concerns a video output amplifier for driving an image display device in a video signal processing system employing digital video signal processing techniques.

A digital television signal processing system recently introduced by the Worldwide Semiconductor Group (Freiburg, West Germany) of International Telephone and Telegraph Corporation is described in an ITT Corporation publication titled "VLSI Digital TV System—DIGIT 2000." In that system color video signals, after being processed in digital (binary) form, are converted to analog form by means of digital-to-analog converters before being coupled to an image displaying kinescope. The analog color video signals are coupled to the kinescope via analog buffer amplifiers and video output kinescope driver amplifiers which provide video output signals at a high level suitable for driving intensity control electrodes of the kinescope.

It is herein recognized as desirable to provide a digital video signal processing system wherein the functions of the output digital-to-analog converter and kinescope driver are combined, thereby eliminating the need for the analog kinescope driver amplifier stage and eliminating many of the problems associated with analog kinescope driver stages.

Accordingly, pursuant to the principles of the present invention there is disclosed herein a video signal digital-to-analog converter capable of directly driving an intensity control electrode such as the cathode electrode of a kinescope in a television receiver or similar video signal processing system employing digital video signal processing techniques. The disclosed driver stage employs high voltage VMOS FET output devices which operate in conjunction with digital video input switched constant current sources, for developing from summed switched constant current signals an output high voltage analog signal suitable for directly driving a cathode intensity control electrode of the kinescope.

In accordance with a feature of the invention a circuit is included for stabilizing the output DC level of the disclosed driver stage.

Figure 1:
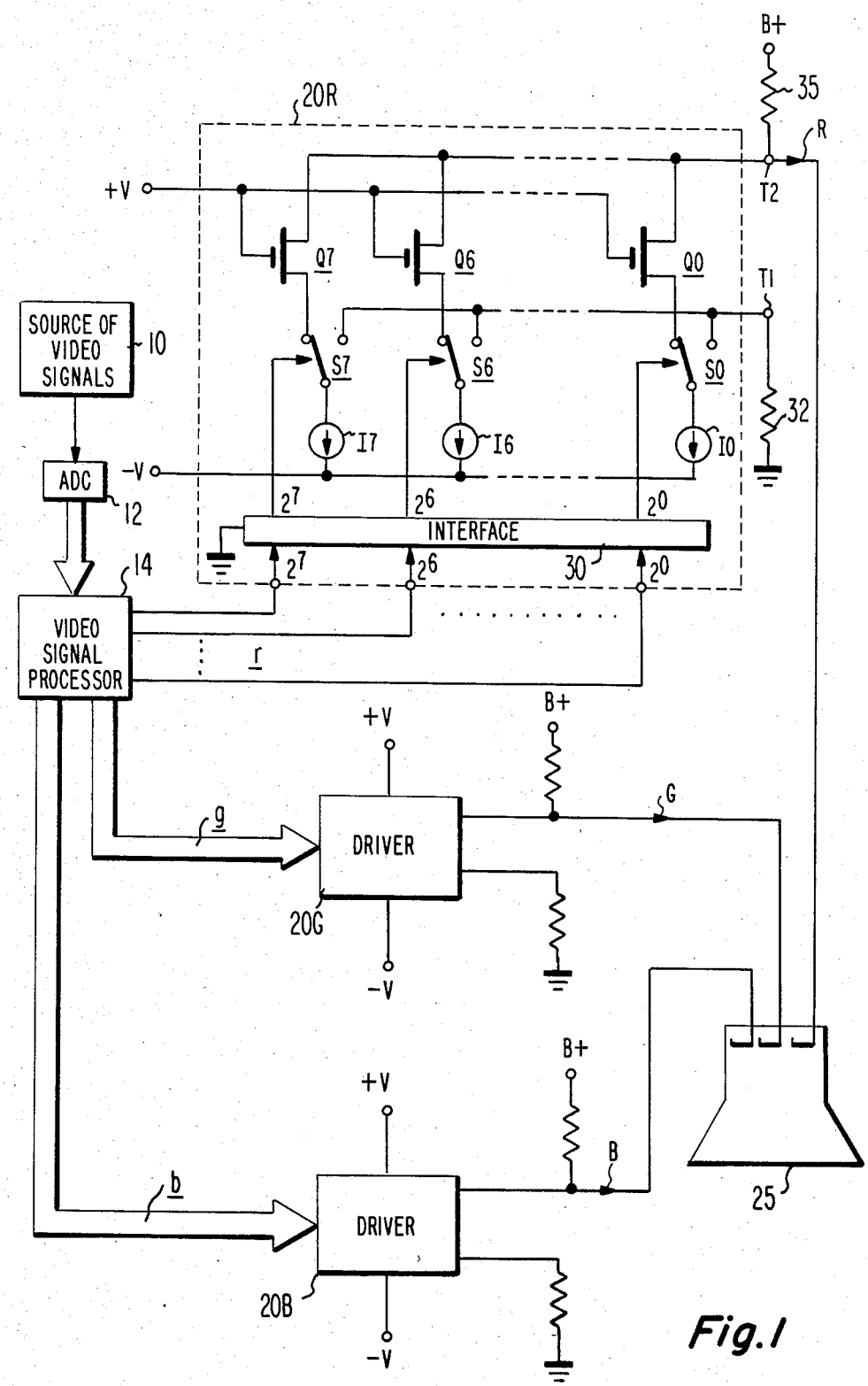
FIG. 1 shows a portion of a color television receiver including a digital-to-analog converter/driver according to the present invention.

In FIG. 1, analog color television video signals from a source 10 are converted to digital (binary) form by means of an analog-to-digital converter (ADC) 12. Digital signals from ADC 12 are processed by a digital video signal processor 14 including luminance and chrominance signal processing networks and a network for combining processed luminance and chrominance signals to produced plural output color image representative signals r, g and b. In this example the r, g and b signals are each represented by an 8-bit digital signal in binary form ($2^0 \ldots 2^7$), and are applied to binary inputs of digital-to-analog converter/driver stages 20R, 20G and 20B, respectively. High level R, G and B analog output signals from drivers 20R, 20B and 20G are respectively directly applied to cathode intensity control electrodes of a color kinescope 25. Since the converter/driver stages are similar in structure and operation, only the structure and operation of driver 20R will be described in detail.

The 8-bit ($2^0 \ldots 2^7$) r digital signal is coupled to an input interface network 30 including buffers and level shifting circuits. Interface 30 and the included circuits are part of the converter/driver stage itself, and the included circuits produce logic compatibility by shifting the logic levels of the digital signals from source 14 to logic levels compatible with the requirements of the other circuits of the converter/driver stage.

Digital output signals from interface 30 are respectively coupled to control inputs of electronic current switches S0–S7 (shown for purposes of simplicity as electro-mechanical switches), the inputs of which are respectively coupled to binary weighted constant current sources I0–I7. Each of switches S0–S7 has first and second outputs. The first outputs are connected in common and to a resistor 32 via a terminal T1. The second outputs are separately connected to the source electrodes of respectively associated high voltage MOS output transistors Q0–Q7, which preferably are enhancement mode VMOS (Vertical MOS) FET devices such as the BS 107 device type available from ITT of Freiburg, West Germany or the BSS 93 device type available from Siemens of Munich, West Germany.

VMOS transistors Q0–Q7 correspond to vertically (in contrast to laterally) structured semiconductor devices which are coupled in parallel and which can be readily constructed on a common integrated circuit substrate, either alone or together with switches S0–S7, current sources I0–I7, and interface network 30.

VMOS devices Q0–Q7 have drain and source electrodes arranged along a vertical axis (in contrast to lateral devices which have gate, source and drain elements on the same surface). Information concerning the structure of VMOS devices is found in U.S. Pat. No. 4,364,073, for example. The physical structure of one form of VMOS device is also shown in my concurrently filed U.S. patent application Ser. No. 644,397, filed Aug. 27, 1984, now U.S. Pat. No. 4,603,319 titled "Digital-To-Analog Converter." The latter application describes a VMOS digital-to-analog signal converter capable of directly driving a high voltage intensity control electrode of an image display device such as a kinescope in a television receiver. In particular, the latter application describes an advantageous converter/driver stage wherein a plurality of VMOS output devices have source areas dimensioned so as to preserve high frequency response and to reduce power consumption.

The vertical structure of the VMOS output devices facilitates the fabrication of these devices with a high breakdown voltage rating, allowing the devices to directly drive the high voltage cathode electrode of the kinescope. The VMOS FET output devices also advantageously exhibit mutually uniform high voltage fast switching characteristics with substantially equal turn-on and turn-off delays, and unwanted switching transients ("glitches") are substantially avoided, particularly in comparison to the high voltage switching characteristics of bipolar transistors. The turn-on and turn-off times of the VMOS output devices are substantially unaffected by the magnitude of the voltage being switched, whereby high voltage kinescope drive is possible. In addition, VMOS technology readily permits the manufacture of low cost integrated VMOS device arrays with common gate and common drain electrodes.

The gate electrodes of output devices Q0–Q7 are connected in common to a source of reference potential +V, and the output drain electrodes of devices Q0–Q7 are connected in common to an output load impedance 35 across which high level analog signal R is developed and appears at output terminal T2. Thus devices Q0–Q7 are connected in a common gate configuration as unity gain current amplifiers with respect to currents conducted to the respective source electrodes via switches S0–S7.

The currents from sources I0–I7 are routed by means of current switches S0–S7 either to terminal T1 and resistor 32, or to output devices Q0–Q7, in accordance with the individual positions of switches S0–S7 as determined by the logic state of the binary output signals ($2^0$ ... $2^7$) from interface 30. An analog kinescope cathode drive voltage appears at terminal T2 as a function of the value of load resistor 35 and the magnitude of the combined drain currents of devices Q0–Q7 as flowing in load resistor 35. Suitable low pass filtering of the signal developed at output terminal T2 is provided by means of load resistor 35 and the capacitance associated with the kinescope cathode.

A voltage developed across resistor 32 at terminal T1 corresponds to a complementary phased version of the cathode drive voltage developed across resistor 35, and may be useful in some systems where, for example, it is desirable to monitor the cathode drive voltage at a low voltage point, or where the complementary signal is intended to be employed for a signal processing purpose, such as in conjunction with a high frequency compensation network of the type disclosed in my concurrently filed U.S. patent application Ser. No. 644,453, filed Aug. 27, 1984 now U.S. Pat. No. 4,599,655 titled "Kinescope Driver with High Frequency Compensation." As described in the latter application, a portion of the video output signal developed at terminal T2 is combined with the complementary signal developed across resistor 32 to produce a resultant high frequency signal representative of high frequency components which may be deficient in the video output cathode drive signal due to output circuit parasitic capacitance effects. The resultant signal is applied to an input of the driver stage to compensate for the high frequency deficiency which may be manifested by the video output signal.

The described high voltage converter/driver arrangement advantageously is capable of driving the cathode electrode of a kinescope directly without need of additional amplifying stages following the converter/driver stage, and is capable of being constructed as an integrated circuit. In addition, the described driver arrangement advantageously does not experience many of the problems associated with analog kinescope driver stages. For example, analog kinescope driver stages may exhibit non-linearity unless compensated for by feedback associated with the kinescope driver. However, the use of feedback can result in stability problems particularly in a wideband driver stage. Analog driver stages also may exhibit unequal rise and fall times of signal amplitude excursions, and may exhibit slew rate problems under large signal conditions unless compensated for by means of feedback.

Figures 2A, 2B:
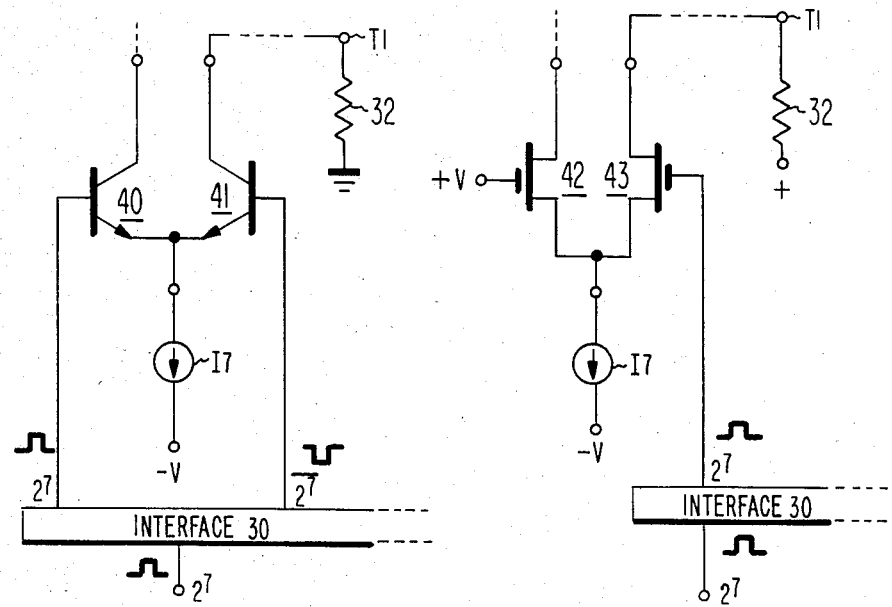
FIGS. 2a–2c show circuit details of portions of the converter/driver in FIG. 1.

FIG. 2a shows a bipolar version of one of the current switches (e.g., S7) of FIG. 1. The bipolar current switch includes NPN transistors 40 and 41 arranged in an emitter coupled, differential input configuration. Oppositely phased signals from the output of interface 30, as associated with and derived from the $2^7$ binary information bit, drive the base electrodes of transistor 40 and 41 so that the collector output currents of transistors 40 and 41 vary in mutually oppositely phased fashion. The currents conducted by transistors 40 and 41 are supplied by constant current source I7. The collector output current of transistor 40 is conducted to the input source electrode of output device Q7 in FIG. 1, and the collector output current of transistor 41 is conducted to terminal T1 and resistor 32 in FIG. 1.

FIG. 2b shows a MOSFET version of one of the current switches (e.g., S7) in FIG. 1. This current switch includes a pair of source-coupled MOS devices 42 and 43 which receive operating currents from current source I7, and which exhibit single-ended drive via a switching signal coupled to the gate of transistor 43. The switching signal is derived from the $2^7$ binary information bit output signal from interface 30. The drain output currents of transistors 42 and 43 are respectively coupled to the input source electrode of output device Q7 in FIG. 1, and to terminal T1 and resistor 32 in FIG. 1. With respect to the arrangement of FIG. 2b, resistor 32 is coupled from terminal T1 to a point of positive potential.

Figure 2C:
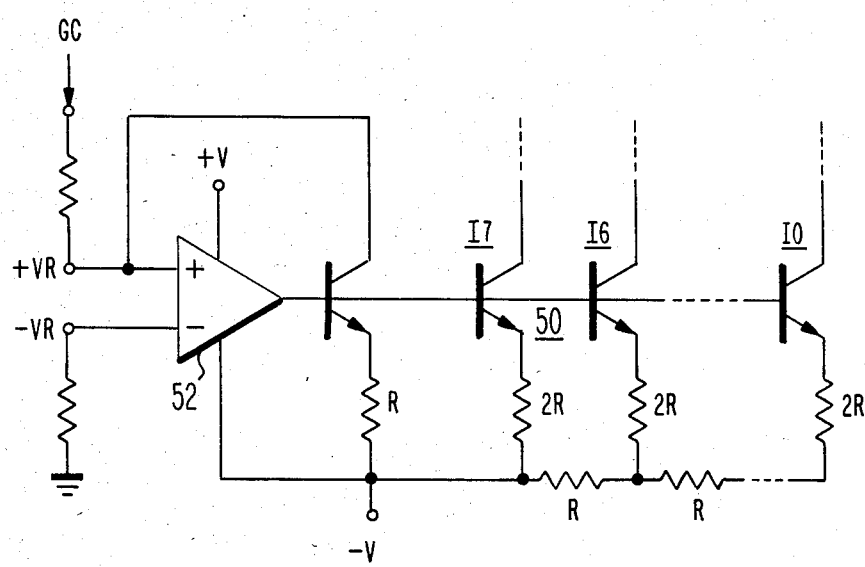

FIG. 2c illustrates a suitable arrangement of binary weighted current sources I0–I7 in FIG. 1. Each current source includes an NPN transistor such as transistor 50 for current source I7, with a collector output coupled to the associated current switch, and an emitter electrode coupled to a binary weighting R/2R resistor ladder network. The current sources can be gain controlled in response to a gain control voltage GC coupled via an amplifier 52 to the base electrodes of each NPN current source transistor. Accordingly, the gain of the digital-to-analog converter/driver stage of FIG. 1 can be varied as a function of the magnitude of control voltage GC which may, for example, represent a contrast control voltage derived from a viewer operated contrast control.

Figure 3:
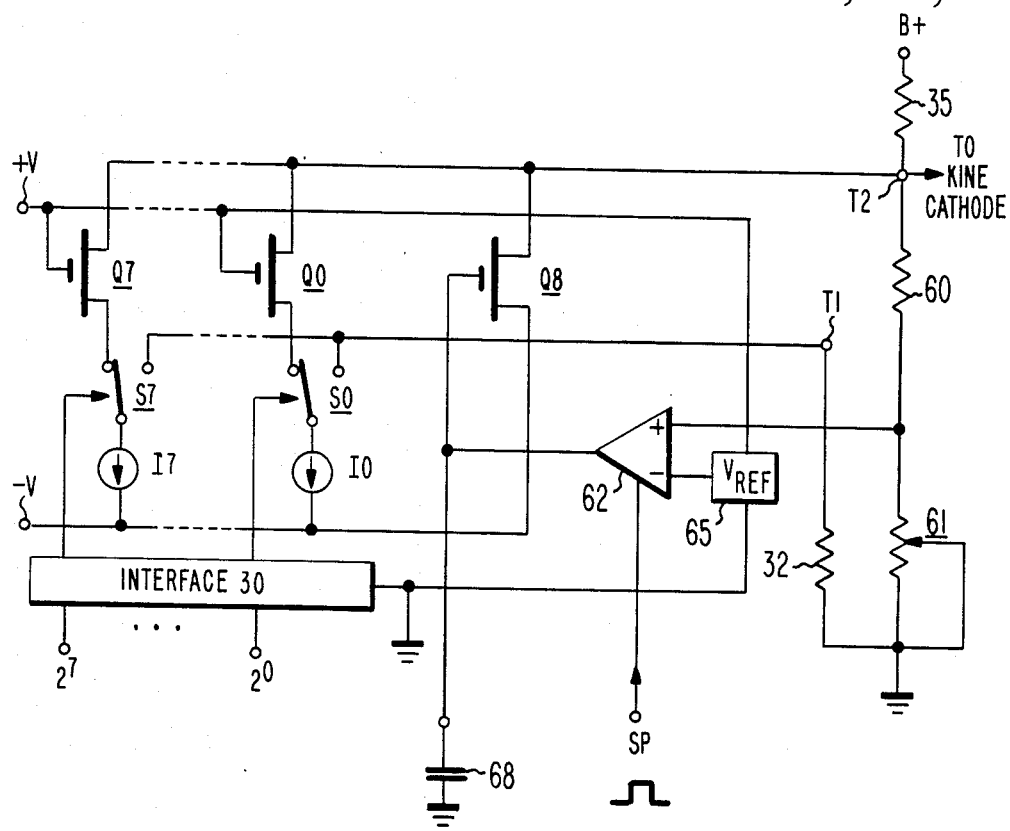
FIG. 3 depicts an arrangement for stabilizing the output DC level of the converter/driver of FIG. 1.

FIG. 3 depicts an output DC stabilization network used in combination with the converter/driver stage comprising transistors Q0–Q7 of FIG. 1, wherein elements common to FIGS. 1 and 3 are identified by the same reference number. The DC stabilization network compensates for variations of the B+ operating supply voltage and for vertical rate ripple in the B+ supply, among other sources of B+ variation, and eliminates the need for a stabilized B+ operating supply voltage.

The DC stabilization network includes an operational transconductance amplifier 62 which is keyed to conduct during each horizontal image blanking interval in response to a sampling pulse SP which encompasses the so-called "back porch" portion of each horizontal blanking interval, for example. When keyed to conduct by sampling pulse SP, amplifier 62 compares an input voltage from a source of reference voltage 65 with an input voltage derived from the junction of voltage divider resistors 60 and 61. The latter resistors are coupled to the kinescope cathode signal path and to driver load resistor 35, so that the voltage developed at the junction of resistors 60 and 61 is related to the magnitude of the DC output level of the driver stage during horizontal blanking intervals when video signal modulation is absent. An error signal related to the difference in magnitude between the inputs to amplifier 62 is stored by a capacitor 68, and applied to a gate input of a high voltage VMOS control transistor Q8. The error signal varies the conduction of transistor Q8 such that the current in load resistor 35 is caused to vary with a sense for reducing the difference between the levels of the input voltage of amplifier 62 to a minimum, thereby stabilizing the horizontal blanking level and the DC level at output terminal T2. Thus by feedback action the stabilization network including amplifier 62 and transistor Q8 maintains the input voltages of amplifier 62 at substantially equal levels, which corresponds to a desired substantially constant quiescent DC level at output terminal T2.

Voltage divider resistor 61 optionally can be adjustable as shown to provide a means for manually adjusting the DC bias for the kinescope cathode as developed at terminal T2. Thus adjustment of resistor 61 can establish a desired level of kinescope cathode bias via the action of the feedback DC stabilization network.

Figure 4:
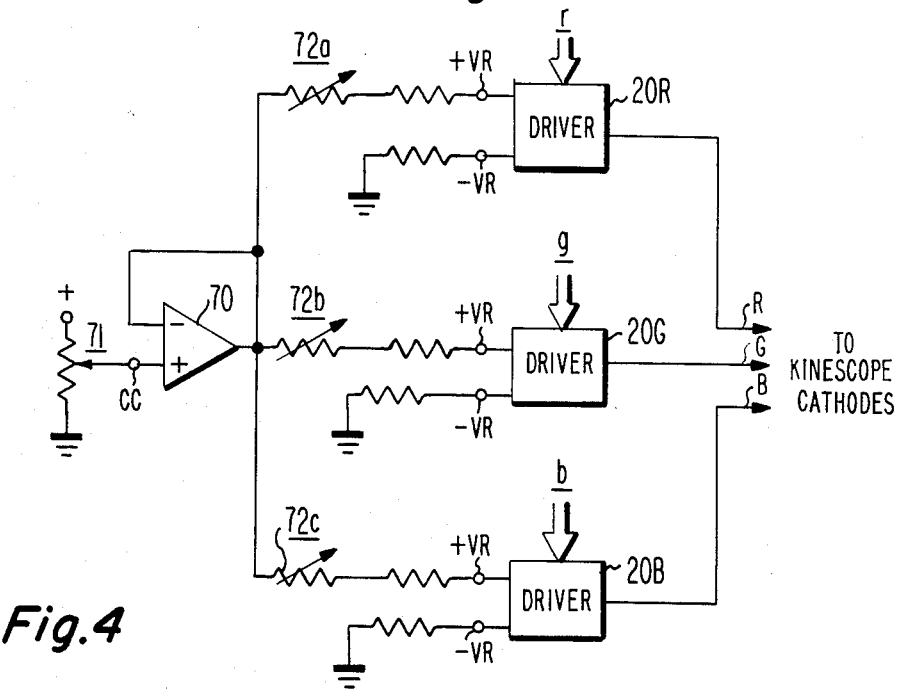
FIG. 4 illustrates a contrast control and white balance control arrangement associated with the converter/driver of FIG. 1.

Image contrast control and white balance control are accomplished as shown by the arrangement of FIG. 4 with respect to each of converter/driver stages 20R, 20G and 20B. For each driver stage the +VR and −VR inputs correspond to inputs associated with the respective current source networks as shown and discussed with respect to FIG. 2c. A viewer adjustable potentiometer 71 provides an analog contrast control voltage CC at a wiper thereof. The contrast control voltage is coupled via a buffer amplifier 70 to the +VR input of the current source of each driver stage, via adjustable resistors 72a, 72b and 72c. The latter adjustable resistors serves as manual white balance controls for separately adjusting the signal gains of the driver stages, during alignment of the system, so that the kinescope properly reproduces a white image display in response to an input white image representative video signal. Thus the gain of each driver stage can be varied in analog format in accordance with the setting of contrast control potentiometer 71 and respective adjustable resistors 72a, 72b and 72c by controlling the conduction of the current sources I0 . . . I7 for each driver stage, as shown in FIG. 2c.

This manner of analog gain control in a digital video signal processing system offers the advantage of not requiring one or more additional digital information bits (e.g., 9-bits rather than 8-bits) to accommodate the additional dynamic range needed for contrast control and white balance control. Thus the described gain control mechanism conserves digital information bits and avoids unnecessarily increasing digital processing circuit size and complexity. Additional information concerning a digital video signal processing and display system employing a video output VMOS converter/driver stage, wherein viewer generated control signals for normally controlling the brightness and contrast of a displayed image are utilized in analog rather than digital form for controlling the magnitude of the video signal, is found in my concurrently filed U.S. patent application Ser. No. 644,400, filed Aug. 27, 1984 now U.S. Pat. No. 4,642,690 titled "Digital Video Signal Processor With Analog Level Control."

Figure 5A:
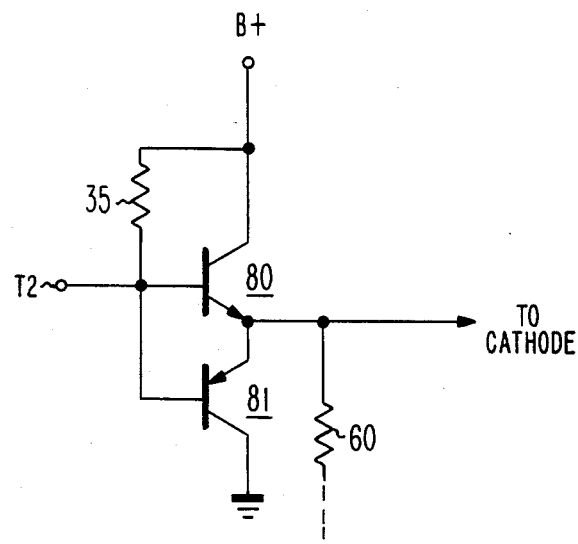
FIGS. 5a and 5b show optional output circuits for use with the converter/driver of FIG. 1.
Figure 5B:
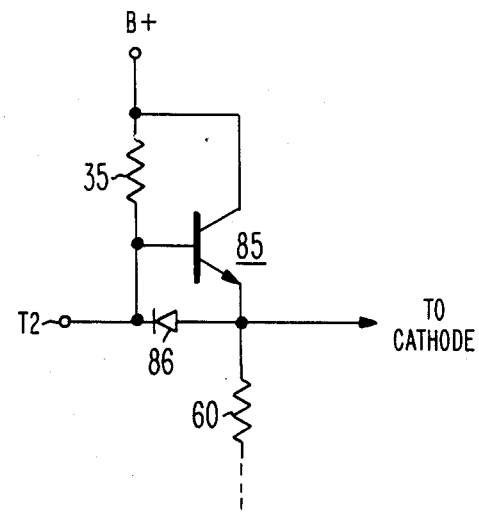

FIGS. 5a and 5b show optional output buffer circuits which permit improved high frequency response for the driver stage. Specifically, the illustrated buffer circuits permit an increase in the value of the load impedance of the driver stage (resistor 35 in FIG. 1) without excessive loss of high frequency signal response.

In FIG. 5a an NPN transistor 80 and a PNP transistor 81 are connected as a complementary emitter follower stage with base inputs coupled to output terminal T2 of the driver stage and with emitter outputs coupled to the kinescope cathode. FIG. 5b illustrates an active load type output buffer including an NPN transistor 85 and a diode 86 arranged as shown. The complementary follower stage of FIG. 5a is preferred for having a more symmetrical response characteristic.

What is claimed is:

1. A digital video signal processing system comprising:
    a source of digital signals including a plurality of bits, representative of video information;
    an image display device having an intensity control electrode; and
    a display driver amplifier, having a plurality of inputs for receiving respective bits of said digital signal, for combining signals relating to said bits of said digital signal at an output combining point so as to directly produce at said output combining point an analog signal representing said video information with a magnitude suitable for directly driving said intensity control electrode.

2. A digital video signal processing system comprising:
    a source of digital video signals containing N information bits;
    image display means responsive to video signals applied to an intensity control electrode thereof; and
    signal converting driver means with an input responsive to said digital video signals, and an output for providing to said intensity control electrode and analog version of said digital video signals with a magnitude suitable for directly driving said intensity control electrode, said driver means corresponding to a digital-to-analog signal converter with N signal inputs for respectively receiving said N information bits of said digital video signal, and an output terminal coupled to said intensity control electrode of said display device; wherein said driver means comprises
    plural input switching means respectively responsive to individual ones of said N information bits, each having an input and an output;
    plural current sources respectively coupled to said inputs of said switching means;
    plural output devices each having a first electrode and second and third electrodes defining a main current conduction path of said output device, said first electrodes of said devices being connected in common, said second electrodes of said devices being connected in common and to said output terminal, and said third electrodes of said devices being coupled to respective outputs of said switching means.

3. A system according to claim 2, wherein
    each of said plural output devices is a high voltage VMOS FET device.

4. A system according to claim 3, wherein
    said first, second and third electrodes respectively correspond to gate, drain and source electrodes.

5. A system according to claim 2, wherein
    each of said switching means has first and second mutually complementary outputs selectively coupled to said current sources in accordance with the state of the respective one of said input digital information bits;

said first outputs of said switching means being respectively coupled to said third electrodes of said output devices; and said second outputs of said switching means being connected in common and coupled to an auxiliary output terminal of said driver means.

6. A digital video signal processing system comprising:

a source of digital video signals containing N information bits;

image display means responsive to video signals applied to an intensity control electrode thereof;

signal converting driver means with an input responsive to said digital video signals, and an output for providing to said intensity control electrode an analog version of said digital video signals with a magnitude suitable for directly driving said intensity control electrode, said driver means corresponding to a digital-to-analog signal converter with N signal inputs for respectively receiving said N information bits of said digital video signal, and an output terminal coupled to said intensity control electrode of said display device; and means coupled to said driver means for stabilizing the DC output level of said driver means.

7. A digital video signal processing system comprising:

a source of digital signals including a plurality of bits, representative of video information;

an image display device having an intensity control electrode;

a display driver amplifier having a plurality of inputs for receiving respective bits of said digital signal for combining said bits of said digital signal so as to directly produce at an output an analog signal representing said video information with a magnitude suitable for directly driving said intensity control electrode; and means coupled to said display driver amplifier for stabilizing the DC output level of said display driver amplifier, said stabilizing means comprising means for periodically sampling the DC output level of said display driver amplifier for developing a control signal representative of the difference between said sampled DC level and a reference level; and means for coupling said control signal to a control input of said display driver amplifier with a sense for reducing said difference to a minimum.

8. A system according to claim 7, wherein said driver means comprises a load impedance; and plural output devices respectively associated with an information bit of said input digital video signal, said plural devices having outputs connected in common to said load impedance; wherein said sampling means operates during periodic video signal blanking intervals for sampling said DC output level at said load impedance; and said control signal is coupled to said load impedance for varying the current conducted thereby to maintain a desired DC outut level.

9. A digital video signal processing system comprising:

a source of digital video signals;

image display means responsive to video signals applied to an intensity control electrode thereof; and signal converting driver means with an input responsive to said digital video signals, and an output for providing to said intensity control electrode an analog version of said digital video signals with a magnitude suitable for directly driving said intensity control electrode; wherein said driver means comprises plural VMOS output transistor devices each having a first electrode and second and third electrodes defining a main current path of said output device, said first electrodes of said devices being connected in common, said second electrodes of said devices being connected in common to a terminal constituting an output terminal of said driver means, and said third electrodes of said devices being coupled to receive said digital video signals.

10. A system according to claim 9, wherein said first, second and third electrodes respectively correspond to gate, drain and source electrodes.

11. A video signal processing system comprising:

a source of digital signals including a plurality of bits, representative of video information;

an image display device having an intensity control electrode; and a display driver amplifier, having a plurality of inputs for receiving respective bits of said digital signal, for combining signals relating to said bits of said digital signal at an output combining point so as to directly produce at said output combining point an analog signal representing said video information with a magnitude suitable for directly driving said intensity control electrode; wherein said driver amplifier comprises plural output devices each constituted by a vertical MOS semiconductor device.

* * * * *